(12) United States Patent
Mandal et al.

(10) Patent No.: US 10,691,829 B2
(45) Date of Patent: Jun. 23, 2020

(54) PRIVACY PRESERVATION

(71) Applicant: FUJITSU LIMITED, Kawasaki-shi, Kanagawa (JP)

(72) Inventors: Avradip Mandal, Sunnyvale, CA (US); Arnab Roy, Santa Clara, CA (US); Hart Montgomery, Redwood City, CA (US); John C. Mitchell, Stanford, CA (US)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 15/487,403

(22) Filed: Apr. 13, 2017

(65) Prior Publication Data

US 2018/0300502 A1 Oct. 18, 2018

(51) Int. Cl.

| | |
|---|---|
| *G06F 21/62* | (2013.01) |
| *G06F 16/16* | (2019.01) |
| *G06F 16/25* | (2019.01) |
| *G06F 16/9535* | (2019.01) |
| *G06Q 30/02* | (2012.01) |
| *G06N 20/00* | (2019.01) |

(52) U.S. Cl.
CPC ........ *G06F 21/6254* (2013.01); *G06F 16/164* (2019.01); *G06F 16/258* (2019.01); *G06F 16/9535* (2019.01); *G06F 21/6227* (2013.01); *G06Q 30/0277* (2013.01); *G06Q 30/0282* (2013.01); *G06N 20/00* (2019.01)

(58) Field of Classification Search
CPC . G06F 21/6254; G06F 21/6218; H04L 67/306
See application file for complete search history.

(56) References Cited

U.S. PATENT DOCUMENTS

| | | | | |
|---|---|---|---|---|
| 7,433,956 B2* | 10/2008 | Zhao | ....................... | H04L 29/06 709/227 |
| 8,719,198 B2* | 5/2014 | Zheng | .................... | G01C 21/20 706/21 |
| 2002/0111920 A1* | 8/2002 | Tresser | ................ | G06Q 20/206 705/74 |
| 2016/0117512 A1* | 4/2016 | Shen | ................... | G06F 21/6263 726/26 |

(Continued)

OTHER PUBLICATIONS

Sarwar et al., Item-Based Collaborative Filtering Recommendation Algorithms, May 2001, WWW10, pp. 285-295. (Year: 2001).*

(Continued)

*Primary Examiner* — Dao Q Ho
(74) *Attorney, Agent, or Firm* — Maschoff Brennan

(57) ABSTRACT

An anonymization system may include a merger to merge a public database and a private database to create a merged database. The merged database may include multiple blank entries and multiple initial values associated with multiple user identifiers. The anonymization system may include a value generator to fill values for the blank entries via a machine learning algorithm and based on the initial values to create a filled database including the initial values and the fill values. The anonymization system may include a perturber to perturb one or more of the initial values or the fill values of the filled database to create a perturbed database. The anonymization system may include a releaser to release at least a portion of the perturbed database.

17 Claims, 3 Drawing Sheets

(56) References Cited

U.S. PATENT DOCUMENTS

2017/0193244 A1* 7/2017 Riley .................. G06F 16/245

OTHER PUBLICATIONS

Narayanan, Arvind, and Vitaly Shmatikov. "Robust de-anonymization of large sparse datasets." 2008 IEEE Symposium on Security and Privacy (sp 2008). IEEE, 2008.

Datta, Anupam, Divya Sharma, and Arunesh Sinha. "Provable de-anonymization of large datasets with sparse dimensions." International Conference on Principles of Security and Trust. Springer Berlin Heidelberg, 2012.

Sweeney, Latanya. "k-anonymity: A model for protecting privacy." International Journal of Uncertainty, Fuzziness and Knowledge-Based Systems 10.05 (2002): 557-570.

Dwork, C.: Differential Privacy. In: Bugliesi, M., Preneel, B., Sassone, V., Wegener, I. (eds.) ICALP 2006. LNCS, vol. 4052, pp. 1-12. Springer, Heidelberg (2006).

Li, Ninghui, Tiancheng Li, and Suresh Venkatasubramanian. "t-closeness: Privacy beyond k-anonymity and l-diversity." Data Engineering, 2007. ICDE 2007. IEEE 23rd International Conference on. IEEE, 2007.

Machanavajjhala, A., Kifer, D., Gehrke, J. and Venkitasubramaniam, M., 2007. l-diversity: Privacy beyond k-anonymity. ACM Transactions on Knowledge Discovery from Data (TKDD), 1(1), p. 3.

Kifer, D. and Machanavajjhala, A., 2014. Pufferfish: A framework for mathematical privacy definitions. ACM Transactions on Database Systems (TODS), 39(1), p. 3.

Cormode, G. and Srivastava, D., Jun. 2009. Anonymized data: generation, models, usage. In Proceedings of the 2009 ACM SIGMOD International Conference on Management of data (pp. 1015-1018). ACM.

http://www.nytimes.com/2006/08/09/technology/09aol.html retrieved Apr. 13, 2017.

* cited by examiner

PRIVACY PRESERVATION

FIELD

The embodiments discussed herein are related to privacy preservation.

BACKGROUND

Data releases may be subject to de-anonymization attacks. De-anonymization attacks may attempt to identify individuals associated with some particular released data. Individuals may be associated with the data even in instances where traditionally personal identifiers, such as names, telephone numbers, addresses, social security numbers and/or other unique identification numbers, or the like, are absent. For example, it has been observed that approximately 87 percent of the population of the United States may be uniquely identified based on a gender, a date of birth, and a 5-digit residence zip code. Thus, anonymity may not be achieved even when data may not include traditional identifiers for individuals associated with the data.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an anonymization system may include a merger to merge a public database and a private database to create a merged database. The merged database may include multiple blank entries and multiple initial values associated with multiple user identifiers. The anonymization system may include a value generator to fill values for the blank entries via a machine learning algorithm and based on the initial values to create a filled database including the initial values and the fill values. The anonymization system may include a perturber to perturb one or more of the initial values or the fill values of the filled database to create a perturbed database. The anonymization system may include a releaser to release at least a portion of the perturbed database.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

DESCRIPTION OF EMBODIMENTS

Figure 1:
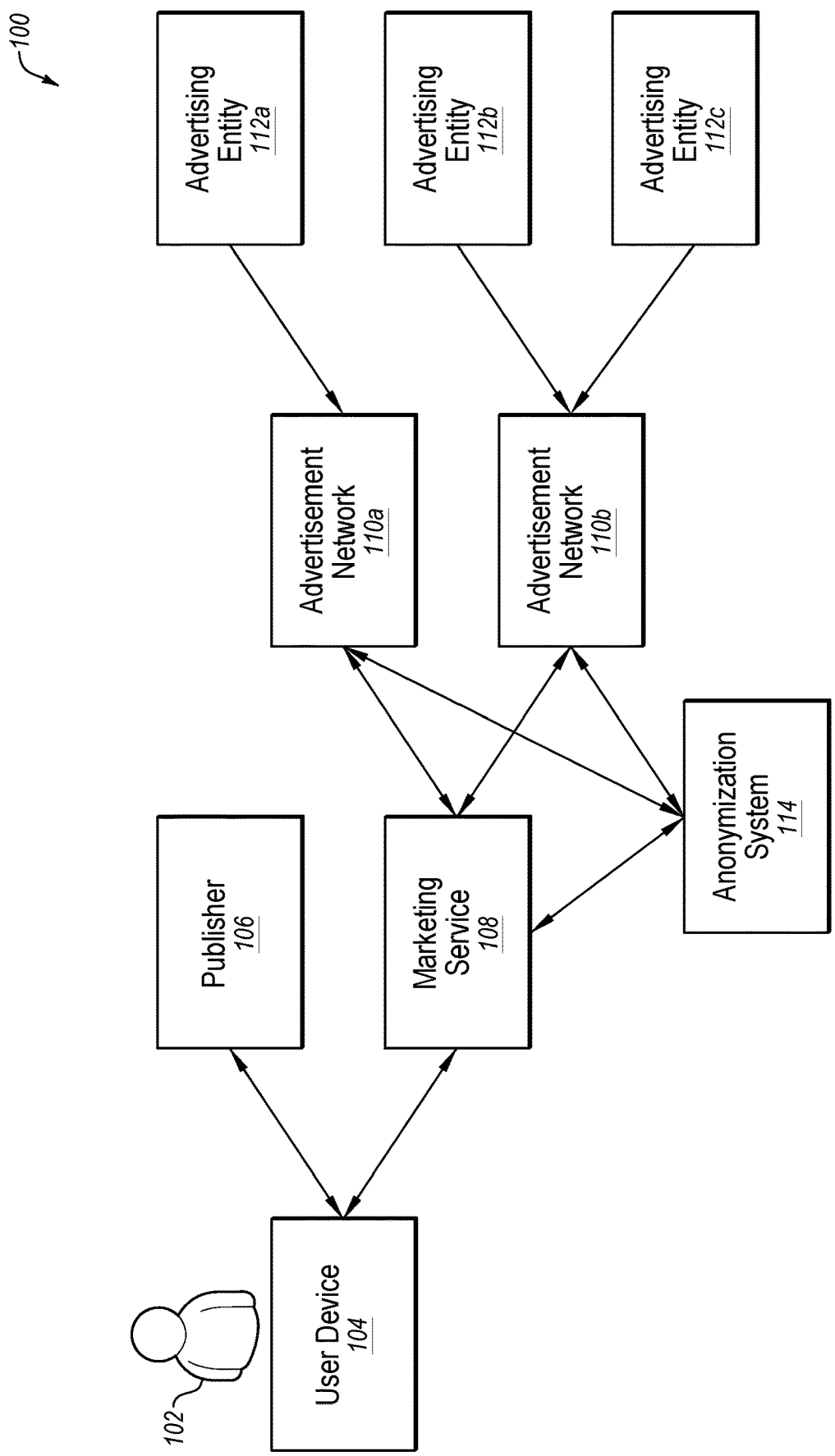
FIG. 1 is a diagram of an example targeted advertising system.

Some embodiments described herein may include data release mechanisms that may discourage de-anonymization of the released data. The data release mechanisms may improve data security technologies, privacy preservation technologies, data vulnerability technologies, as well as related technologies, such as online advertisement technologies, data management technologies, and the like.

Several techniques exist for attempting to anonymize data in a manner that discourages de-anonymization attacks. Some conventional anonymization techniques may remain susceptible to de-anonymization and/or may anonymize the data in a manner that may render the techniques suboptimal for some applications. For example, some conventional anonymization techniques may result in data that may be associated with particular users through comparisons to publically available data. Alternately or additionally, some conventional anonymization techniques may remove information that may be relevant to a system receiving the resulting data. For example, conventional anonymization techniques may be incompatible with recommendation systems, such as online advertising systems. For instance, some conventional anonymization techniques may not facilitate row querying or tracing back to the data.

In some instances, private data anonymized via conventional anonymization techniques may be de-anonymized through comparisons to public data. To illustrate, private rating data may be released with customer information removed. The private rating data may reflect private ratings assigned by users to products and/or services. Public rating data may reflect public ratings assigned by a user to products and/or services. The private rating data may be compared to the public rating data to associate the private data to a user known to be associated with the public data. Thus, for example, data that a user may have believed was private, such as private data that may not be included in the public data, may be publically associated with the user by de-anonymization attacks that may use the private data in a manner not authorized by the user.

Alternately or additionally, conventional anonymization algorithms may remove relevant data in the attempt to resist de-anonymization attacks. For example, some anonymization algorithms may remove and/or generalize attributes such that identifying characteristics associated with a particular user match some number of additional users in the same database. Accordingly, relevant information may be removed or generalized.

In some configurations, conventional anonymization algorithms may remove private database entries that are common to the private data and the public data in an attempt to discourage matching the private data to the public data. However, in some instances, machine learning may be employed to fill in removed entries with expected values and then associate the filled private data with the public data. Conventional anonymization technology may not facilitate provable, quantitative privacy for individualized data, used coarsely, in the presence of public information.

Embodiments may improve anonymization technology. Some embodiments may facilitate provable, quantitative privacy for individualized data, used coarsely, in the presence of public information. Further, the technological improvements associated with some embodiments may be substantial. In some instances, information associated with a user through successful de-anonymization attacks may be used in further de-anonymization attacks on other data. Thus, for example, the improvements some embodiments may make to anonymization technology may act to resist a successful series of self-reinforcing de-anonymization attacks against multiple data releases.

Some embodiments may facilitate the anonymization of data such that de-anonymization attacks may not be successful. Furthermore, embodiments may facilitate the anonymization of data such that the data remains available for single-row queries. Thus, for example, some embodiments may facilitate anonymization for systems such as targeted online ad placement systems or the like.

Embodiments will be explained with reference to the accompanying drawings.

FIG. 1 is a diagram of an example targeted advertising system 100. The system 100 may include a user 102 and an associated user device 104. The user device 104 may include a device capable of connecting to the internet and/or navigating the world-wide web. For example, the user device 104 may include a desktop computer, a laptop computer, a tablet computer, a mobile phone, a wearable device, or the like or any combination thereof.

The user device 104 may interact with and receive content from a publisher 106. The publisher 106 may provide content to the user device 104. The content may include a website, a webpage, an internet-connected application, or the like or any combination thereof.

Furthermore, an advertisement may be delivered to the user device 104 from a marketing service 108. The advertisement may be displayed alongside the content from the publisher 106, integrated into the content from the publisher 106, displayed in a separate frame, window, or tab relative to the content from the publisher 106, or the like or any combination thereof. An opportunity to deliver an advertisement to the user device 104 may be described as an advertisement impression.

The marketing service 108 may include an advertisement exchange service, an advertisement auction service, or the like or any combination thereof. The marketing service 108 may generally match users, such as the user 102 and/or user devices, such as the user device 104, to targeted advertisements. The marketing service 108 may receive internet cookie data associated with the user device 104 and/or the user 102.

The marketing service 108 may share the cookie data with advertisement networks, such as an advertisement network 110a and an advertisement network 110b (collectively, "advertisement networks 110"). The advertisement networks 110 may submit bids to the marketing service 108. The bids may reflect an amount of money that the advertisement networks 110 will pay if a particular advertisement is delivered to the user device 104, or an amount of money that the advertisement networks 110 will pay if the user 102 navigates to a location associated with the advertisement (described herein as "click throughs"), or the like or any combination thereof.

The advertisement networks 110 may generally manage advertisement campaigns associated with advertising entities such as an advertising entity 112a, an advertising entity 112b, and an advertising entity 112c (collectively, "advertising entities 112"). The advertising entities 112 may generally include businesses, charities, political organizations, or the like or any combination thereof. The advertising campaigns may include advertisements to be delivered to user devices such as the user device 104 such that the advertisements may be seen by users such as the user 102.

By way of example, an advertisement campaign may include one or more advertisements for a particular automobile associated with an automobile manufacturer advertising entity, such as advertising entity 112a. The automobile manufacturer advertising entity 112a may provide the vehicle advertisements to the advertisement network 110a. Alternately or additionally, the advertising entity 112a may provide rules that may identify a demographic or demographics to which the advertisement may be delivered. The identified demographic or demographics may include the user 102. The advertising entity 112a may alternately or additionally provide payment rules that may identify an amount the advertising entity 112a will pay if the advertisement is delivered to the user device 104, is clicked through by the user 102, or the like.

The advertisement networks 110 may have multiple advertisement campaigns from multiple advertising entities and may submit bids to the marketing service 108. An advertisement associated with a winning bid may be delivered to the user 102. For instance, the advertising network 110a may submit a bid of $0.003 to deliver an advertisement associated with the advertising entity 112a and the advertising network 110b may submit a bid of $0.002 to deliver an advertisement associated with the advertising entity 112b. The $0.003 bid may be the winning bid and the advertisement associated with the advertising entity 112a may be delivered to the user device 104.

The marketing service 108 and the advertisement networks 110 may maintain and may share data regarding the user 102, the user device 104, other users, and other user devices. The data may permit the advertisement networks 110 to determine whether to bid on an advertisement impression opportunity. Alternately or additionally, the data may permit the advertisement networks 110 to determine how much to bid on an advertisement impression opportunity. For example, the advertising entities 112 may pay to deliver advertisements to a particular demographic and/or may pay relatively more to deliver advertisements to another demographic.

Conventionally, such data may be susceptible to de-anonymization attacks. For instance, the data may include a database with each row associated with a different user. A de-anonymization attacker may compare the data with public information from other databases, such as information from social networks, rating and review services, discussion websites, public records, data describing traits within the general population, or the like or any combination thereof.

In some embodiments, a perturbed database may be generated for use by the advertisement networks 110 and the marketing service 108. The perturbed database may be used to provide the advertisement networks 110 and the marketing service 108 with relevant information regarding the user 102 and/or the user device 104. The perturbed database may alternately or additionally be configured to resist de-anonymization attempts. In some embodiments, the perturbed database may include information regarding interests and behaviors of the user 102. The perturbed database may be indexed by a supercookies, which may be associated with users, such as the user 102. The supercookies may be selected randomly, such that the supercookies may not provide information about the particular identities of the associated users. In some embodiments, the supercookies may facilitate row queries or traceback requests to the perturbed database by the marketing service 108 and/or the advertisement networks 110.

In some configurations, information about the user 102 may be provided from the perturbed database to the marketing service 108 and/or the advertisement networks 110. For example, a row of data associated with the user 102 and/or the user device 104 may be provided to the marketing service 108 and/or the advertisement networks 110. The advertisement networks 110 may use the information from the perturbed database to decide how much money to bid on an advertisement impression for the user 102.

In some embodiments, the system 100 may include an anonymization system 114. The anonymization system 114 may generate the perturbed database. The anonymization system 114 may provide information from the perturbed database to the marketing service 108 and/or the advertisement networks 110. In some configurations, the anonymization system 114 may be included in the marketing service 108 and the information from the perturbed database may be provided to the advertisement networks 110. The anonymization system 114 may receive traceback requests to information in the perturbed database. For example, the anonymization system 114 may receive and respond to requests for data associated with supercookies of the perturbed database. The anonymization system may be described herein as an anonymizer.

Figure 2:
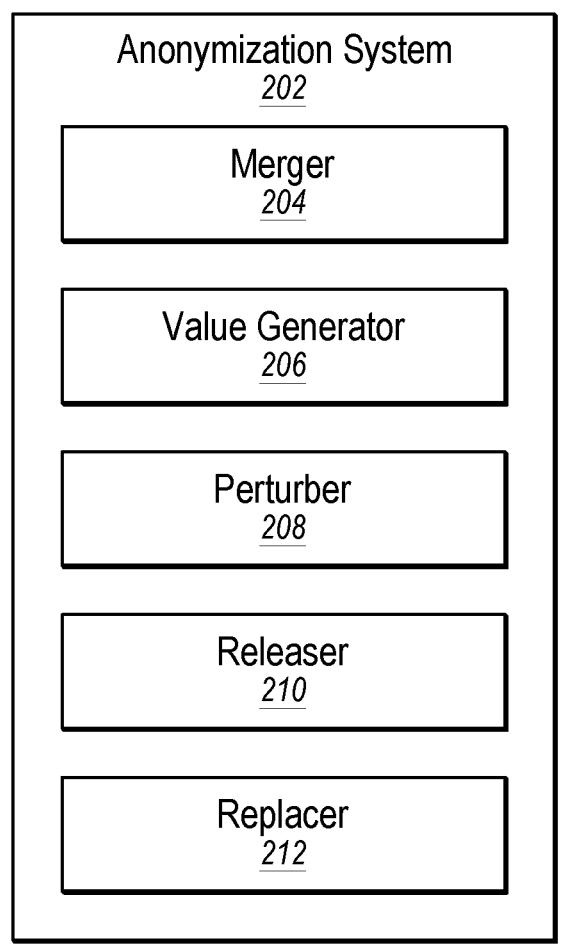
FIG. 2 is a diagram of an example anonymization system.

FIG. 2 is a diagram of an example anonymization system 202. The anonymization system 202 may generally correspond to the anonymization system 114 of FIG. 1. The anonymization system 202 may include a merger 204, a value generator 206, a perturber 208, a releaser 210, and a replacer 212.

The merger 204 may merge a public database and a private database to create a merged database. The private database may include values associated with particular users, such as the user 102 of FIG. 1, and/or with particular user devices, such as the user device 104 of FIG. 1. The values of the private database may include demographics data associated with the users, ratings data associated with the users, internet and/or world wide web usage data associated with the users, location data associated with the users, purchasing habit data and/or product browsing data associated with the users, social connection data associated with the users, or the like or any combination thereof. The values of the private database may be associated with data that the users may not have given express or implied consent to be disseminated or otherwise directly associated with the users.

The public data may also include values associated with the users. The values of the public database may include data the same as or similar to the data of the private database. The values of the public database may be associated with data that the users may have given express or implied consent to be publically disseminated or otherwise directly associated with the users. In some embodiments, the data from the private database may be used to associate users of the private database with users of the public database.

In some embodiments, duplicate entries may exist in the public database as well as the private database. For instance, a user may have rated a product on a public website and may have rated the same product within a private system. In some configurations, the values of the duplicate entries may be averaged. Alternately or additionally, the values of one or more of the private database and the public database may be normalized such that the values share a scale. For example, a rating of 4 stars in a 5-star rating system may be normalized to a rating of 8.0 points to be averaged with a rating based on a 10-point system.

The merger 204 may merge the public database and the private database in a manner represented by the following expression:

$$D = D_1 \cup D_2$$

Where $D_1$ may represent the public database, $D_2$ may represent the private database, and D may represent the merged database. In some embodiments, multiple public databases may be merged with the private database and/or the public database may include data from multiple other public databases.

Some entries may be blank in both the private database and the public database. For example, in instances where the private database includes product ratings, an entry may be blank for a particular user if the particular user did not rate the associated product. As used herein, a blank entry may include an entry with a null value, or some other equivalent value associated with the entry. The associated entry may be likewise blank in the public database. Thus, for example, an associated value in the merged database may also be blank. Accordingly, for example, the merged database may include multiple blank entries and multiple values, resulting from the merging of the private database and the public database.

The anonymization system 202 may further include a value generator to generate fill values for blank entries of the merged database. The resulting filled database may be described herein as a filled database. The fill values may be generated using one or more machine learning algorithms. For example, the fill values may be generated using item-based collaborative filtering. A model may be extracted based on available and present data. For example, a model may be extracted based, at least, on the public database, the private database, and/or the merged database. Estimations for the blank entries may be based on the extracted model.

The generation of the fill values may be represented by the following expression:

$$D \rightarrow D'$$

Where D' may represent the filled database. Filling the blank entries may discourage de-anonymization attacks based on comparisons of private database values to public database values. In some embodiments, information indicating which values were missing from the merged database may be suppressed, disguised, and/or otherwise may not be released.

The anonymization system 202 may include a perturber to perturb one or more of the values of the filled database. In some embodiments, the values of the filled database may be perturbed such that rows of the public database may not be close to the rows of the resulting perturbed database. For example, the values of the filled database may be perturbed such that rows of the public database may not be close in $L_p$ distances to the rows of the resulting perturbed database. By way of example, the filled database may be perturbed according to the following expression:

For each dist∈DistMetricSet:
  For each row∈$D_1$:
    Perturb D' to $D_p$ such that the following set contains many entries which are not close to each other based on $L_2$ distance, measured on the private column values, e.g., columns that are present in $D_2$ but not in $D_1$:

$$S = \{row' \in D_p : dist(row, row') < d_{min} + \varepsilon\}$$

where:

$$d_{min} = \min_{row' \in D'} dist(row, row')$$

Where a set of metrics, which may be referenced as DistMetricSet, may include multiple distance metrics, which may be referenced by dist. The perturbed database may be referenced by $D_p$. A distance epsilon may be referenced by ε. In some embodiments, for each row in the filled database, a set of points, which may be represented by S, close to the row may be calculated. The set of points may represent the most likely de-anonymization candidates for the particular row. The amount of information that these candidates may reveal about the private attributes of the particular row may be considered. For example, if the private attributes of the particular row in the set are relatively close to each other, then uncertainty about the particular row's private attributes may be reduced. Thus, for example, perturbation may be employed to discourage the private attributes of elements of S from being relatively close to each other.

The distance may be based on $L_2$ distance, which may also be described as an $L_2$ norm. Employing $L_2$ distance may encourage the set S to be diverse with respect to privacy sensitive entries. In some configurations, distances other than $L_2$ distance may alternately or additionally be employed.

By way of example, the DistMetricSet may include an $L_p$ distance metric that may ignore null entries. Perturbing the database based on a distance that ignores null entries may discourage direct de-anonymization attacks on the resulting perturbed database. Alternately or additionally, the DistMetricSet may include an $L_p$ distance metric that may consider filled entries. That is, the $L_p$ distance metric may consider entries that have been filled based on collaborative filtering.

Perturbing the values of the database may generally include reducing the granularity, the precision, and/or the accuracy of the data in the perturbed database. For example, where the database values include real numbers, Gaussian noise may be applied to the values. Alternately or additionally, where the database values include categorical values, the values may be perturbed to provide fewer categories. For example, if the database values include zip code entries, the zip codes may be truncated. For example, the zip code 94085 may be perturbed to 9408* or may be perturbed to 940**.

In some embodiments, entries associated with relatively more utility may be relatively less perturbed. Alternately or additionally, entries associated with relatively less utility may be relatively more perturbed. For example, in some configurations, entries that may be of relatively higher interest to a receiver of information from the perturbed database, such as the marketing service 108 and/or the advertisement networks 110 of FIG. 1, may be relatively less perturbed. Accordingly, for example, entries that may have relatively less utility may be relatively more perturbed than entries that have relatively more utility such that de-anonymization attacks may be discouraged while providing information that may be utilized by the receiver. By way of example, where zip code entries have a relatively high utility and age entries have a relatively low utility, the zip code entries may be unperturbed or may be lightly perturbed, and the age entries may be heavily perturbed, such as by changing particular ages to age ranges, such as <18 years, 18-29 years, 30-44 years, 45-60 years, >60 years, or the like.

The anonymization system 202 may include a releaser 210 to release at least a portion of the perturbed database. For example, the releaser 210 may release a row of values associated with a user, such as the user 102 of FIG. 1, or a user device, such as the user device 104 of FIG. 1, from the perturbed database. In some instances, the releaser 210 may release the information to a marketing service, such as the marketing service 108 of FIG. 1 or advertisement networks, such as the advertisement networks 110 of FIG. 1. In some embodiments, the releaser 210 may release the at least a portion of the perturbed database in response to receiving a row query and/or a traceback request, such as a traceback request for data associated with a supercookie received from the marketing service or the advertisement networks.

The anonymization system may further include a replacer 212 to replace user identifiers with random supercookies. In some embodiments, the user identifiers may be replaced with random supercookies in the merged database, the filled database, and/or the perturbed database. Thus, for example, the user identifiers may be replaced with random supercookies after the merged database is created and before a portion of the perturbed database is released.

In some configurations, user identifiers of the filled database may be replaced with random supercookies to generate a supercookie indexed database. The creation of the supercookie indexed database may be represented by the following expression:

$$D' \rightarrow D''$$

In such configurations, the supercookie indexed database may be perturbed in place of the filled database.

In other configurations, a supercookie indexed database may be used in place of the merged database in configurations where the user identifiers of the merged database are replaced by random supercookies. In such configurations, the supercookie indexed database may be filled in place of the merged database to generate the filled database. In still other configurations, a supercookie indexed database may be used in place of the perturbed database.

Figure 3:
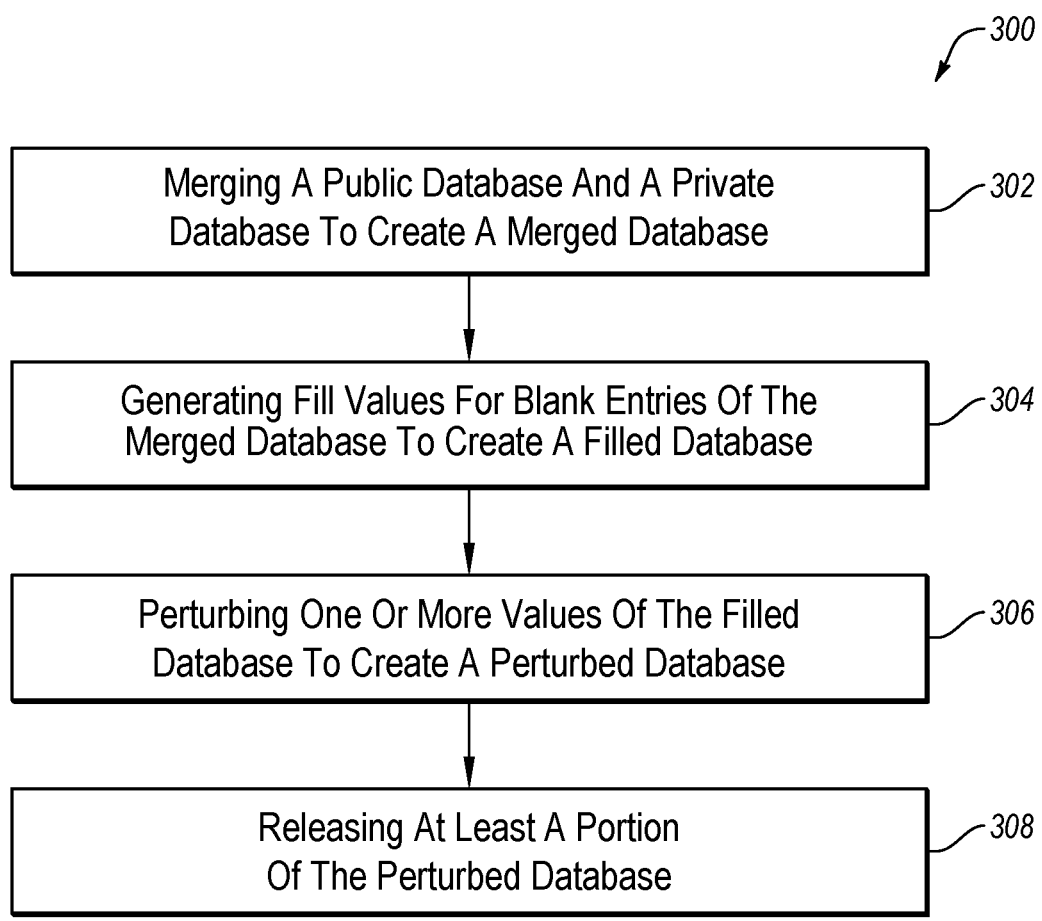
FIG. 3 is a flowchart of an example method.

FIG. 3 is a flowchart of an example method 300. In some embodiments, the method 300 may be performed in the example targeted advertising system 100 of FIG. 1. By way of example, the method 300 may be performed by an anonymization system, such as the anonymization system 114 of FIG. 1 and/or the anonymization system 202 of FIG. 2.

The method 300 may begin at block 302 by merging a public database and a private database to create a merged database. The private database may include values associated with particular users, such as the user 102 of FIG. 1, and/or with particular user devices, such as the user device 104 of FIG. 1. The values of the private database may include demographics data associated with the users, ratings data associated with the users, internet and/or world wide web usage data associated with the users, location data associated with the users, purchasing habit data and/or product browsing data associated with the users, social connection data associated with the users, or the like or any combination thereof. The values of the private database may be associated with data that the users may not have given express or implied consent to be disseminated or otherwise directly associated with the users.

The public data may also include values associated with the users. The values of the public database may include data the same as or similar to the data of the private database. The values of the public database may be associated with data that the users may have given express or implied consent to be publically disseminated or otherwise directly associated with the users. In some embodiments, data from the private database may be used to associate users of the private database with users of the public database.

In some embodiments, duplicate entries may exist in the public database as well as the private database. For instance, a user may have rated a product on a public website and may have rated the same product within a private system. In some configurations, the values of the duplicate entries may be averaged. Alternately or additionally, the values of one or more of the private database and the public database may be normalized such that the values share a scale. For example, a rating of 4 stars in a 5-star rating system may be normalized to a rating of 8.0 points to be averaged with a rating based on a 10-point system.

The merging of the public database and the private database may be represented by the following expression:

$$D = D_1 \cup D_2$$

Where $D_1$ may represent the public database, $D_2$ may represent the private database, and D may represent the merged database.

Some entries may be blank in both the private database and the public database. For example, in instances where the private database includes product ratings, an entry may be blank for a particular user if the particular user did not rate the associated product. As used herein, a blank entry may include an entry with a null value, or some other equivalent value associated with the entry. The associated entry may be likewise blank in the public database. Thus, for example, an associated value in the merged database may also be blank. Accordingly, for example, the merged database may include multiple blank entries and multiple values, resulting from the merging of the private database and the public database.

The method 300 may continue to block 304 by generating fill values for blank entries of the merged database. The resulting filled database may be described herein as a filled database. The fill values may be generated using one or more machine learning algorithms. For example, the fill values may be generated using item based collaborative filtering. A model may be extracted based on available and present data. For example, a model may be extracted based, at least, on the public database, the private database, and/or the merged database. Estimations for the blank entries may be based on the extracted model.

The generation of the fill values may be represented by the following expression:

$$D \rightarrow D'$$

Where D' may represent the filled database. Filling the blank entries may discourage de-anonymization attacks based on comparisons of private database values to public database values. In some embodiments, information indicating which values were missing from the merged database may be suppressed, disguised, and/or otherwise may not be released.

The method 300 may continue to block 306 by perturbing one or more of the values of the filled database. In some embodiments, the values of the filled database may be perturbed such that rows of the public database may not be close to the rows of the resulting perturbed database. For example, the values of the filled database may be perturbed such that rows of the public database may not be close in $L_p$ distances to the rows of the resulting perturbed database. By way of example, the filled database may be perturbed according to the following expression:

For each dist∈DistMetricSet:
  For each row∈$D_1$:
    Perturb D' to $D_p$ such that the following set contains many entries which are not close to each other based on $L_2$ distance, measured on the private column values, e.g., columns that are present in $D_2$ but not in $D_1$:

$$S = \{\text{row}' \in D_p : \text{dist}(\text{row}, \text{row}') < d_{min} + \varepsilon\}$$

where:

$$d_{min} = \min_{\text{row}' \in D'} \text{dist}(\text{row}, \text{row}')$$

Where a set of metrics, which may be referenced as DistMetricSet, may include multiple distance metrics, which may be referenced by dist. The perturbed database may be referenced by $D_p$. A distance epsilon may be referenced by ε. In some embodiments, for each row in the filled database, a set of points, which may be represented by S, close to the row may be calculated. The set of points may represent the most likely de-anonymization candidates for the particular row. The amount of information that these candidates may reveal about the private attributes of the particular row may be considered. For example, if the private attributes of the particular row in the set are relatively close to each other, then uncertainty about the particular row's private attributes may be reduced. Thus, for example, perturbation may be employed to discourage the private attributes of elements of S from being relatively close to each other.

The distance may be based on $L_2$ distance, which may also be described as an $L_2$ norm. Employing $L_2$ distance may encourage the set S to be diverse with respect to privacy sensitive entries. In some configurations, distances other than $L_2$ distance may alternately or additionally be employed.

By way of example, the DistMetricSet may include an $L_p$ distance metric that may ignore null entries. Perturbing the database based on a distance that ignores null entries may discourage direct de-anonymization attacks on the resulting perturbed database. Alternately or additionally, the DistMetricSet may include an $L_p$ distance metric that may consider filled entries. That is, the $L_p$ distance metric may consider entries that have been filled based on collaborative filtering.

Perturbing the values of the database may generally include reducing the granularity, the precision, and/or the accuracy of the data in the perturbed database. For example, where the database values include real numbers, Gaussian noise may be applied to the values. Alternately or additionally, where the database values include categorical values, the values may be perturbed to provide fewer categories. For example, if the database values include zip code entries, the zip codes may be truncated. For example, the zip code 94085 may be perturbed to 9408* or may be perturbed to 940**.

In some embodiments, entries associated with relatively more utility may be relatively less perturbed. Alternately or additionally, entries associated with relatively less utility may be relatively more perturbed. For example, in some configurations, entries that may be of relatively higher interest to a receiver of information from the perturbed database, such as the marketing service 108 and/or the advertisement networks 110 of FIG. 1, may be relatively less perturbed. Accordingly, for example, entries that may have relatively less utility may be relatively more perturbed than entries that have relatively more utility such that de-anonymization attacks may be discouraged while providing information that may be utilized by the receiver. By way of example, where zip code entries have a relatively high utility and age entries have a relatively low utility, the zip code entries may be unperturbed or may be lightly perturbed, and the age entries may be heavily perturbed, such as by changing particular ages to age ranges, such as <18 years, 18-29 years, 30-44 years, 45-60 years, >60 years, or the like.

The method 300 may continue to block 308 by releasing at least a portion of the perturbed database. For example, a row of values associated with a user, such as the user 102 of FIG. 1, or a user device, such as the user device 104 of FIG. 1, may be released from the perturbed database. In some instances, the information may be released to a marketing service, such as the marketing service 108 of FIG. 1 or advertisement networks, such as the advertisement networks 110 of FIG. 1. In some embodiments, at least a portion of the perturbed database may be released in response to receiving a row query and/or a traceback request, such as a traceback request for data associated with a supercookie received from the marketing service or the advertisement networks.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

For example, in some embodiments, the method 300 may further include replacing the user identifiers with random supercookies. In some embodiments, the user identifiers may be replaced with random supercookies in the merged database, the filled database, and/or the perturbed database. Thus, for example, the user identifiers may be replaced with random supercookies after the merged database is created and before a portion of the perturbed database is released.

In some configurations, user identifiers of the filled database may be replaced with random supercookies to generate a supercookie indexed database. The creation of the supercookie indexed database may be represented by the following expression:

$$D' \rightarrow D''$$

In such configurations, the supercookie indexed database may be perturbed in place of the filled database.

In other configurations, a supercookie indexed database may be used in place of the merged database in configurations where the user identifiers of the merged database are replaced by random supercookies. In such configurations, the supercookie indexed database may be filled in place of the merged database to generate the filled database. In still other configurations, a supercookie indexed database may be used in place of the perturbed database.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the embodiments and the concepts contributed to furthering the art, and are to be construed as being without limitation to such specifically recited examples and conditions. Although embodiments have been described in detail, it should be understood that the various changes, substitutions, and alterations could be made hereto without departing from the scope of the embodiments.

What is claimed is:

1. An anonymization system comprising:
   one or more non-transitory computer-readable media configured to store one or more instructions; and
   one or more processors coupled to the one or more computer-readable media, the one or more processors configured to execute the one or more instructions to cause or direct the anonymization system to perform operations comprising:
   merging a public database and a private database to create a merged database, the merged database including a plurality of first entries that each include a null value and the merged database including a plurality of second entries that each include an initial value, wherein each blank entry and each initial entry is associated with one of a plurality of user identifiers, and wherein each corresponding blank entry is associated with an associated user and includes the null value in response to both the public database and the private database not including information specific to the corresponding blank entry that is associated with the associated user;
   generating fill values for the first entries via a machine learning algorithm and based on the initial values to create a filled database including the initial values and the fill values, wherein the fill values replace the null values and each fill value of each corresponding blank entry is an estimation of the information associated with the corresponding blank entry for the associated user of the corresponding blank entry;
   perturbing one or more of the initial values or the fill values of the filled database such that one or more of the granularity, precision, and accuracy of the one or more perturbed values is decreased to create a perturbed database;
   replacing the plurality of user identifiers with a plurality of random supercookies; and
   releasing at least a portion of the perturbed database.

2. The anonymization system of claim 1, wherein the operations further comprise averaging values of associated entries in the public database and the private database to create associated values in the merged database.

3. The anonymization system of claim 1, wherein the machine learning includes item-based collaborative filtering.

4. The anonymization system of claim 1, wherein the perturbing the one or more of the initial values or the fill values of the values of the filled database includes perturbing the values of the filled database such that distance metrics between rows of the perturbed database and rows of the public database are not close to each other based on $L_2$ distance.

5. The anonymization system of claim 4, wherein the distance metrics include an $L_p$ distance that ignores entries associated with null entries of the public database.

6. The anonymization system of claim 4, wherein the distance metrics include an $L_p$ distance that considers entries associated with null entries of the public database.

7. A method of preserving privacy of individuals associated with database entries, the method comprising:
merging a public database and a private database to create a merged database, the merged database including a plurality of first entries that each include a null value and the merged database including a plurality of second entries that each include an initial value, wherein each blank entry and each initial entry is associated with one of a plurality of user identifiers, and wherein each corresponding blank entry is associated with an associated user and includes the null value in response to both the public database and the private database not including information specific to the corresponding blank entry that is associated with the associated user;
generating fill values for the first entries via a machine learning algorithm and based on the initial values to create a filled database including the initial values and the fill values, wherein the fill values replace the null values and each fill value of each corresponding blank entry is an estimation of the information associated with the corresponding blank entry for the associated user of the corresponding blank entry;
perturbing one or more of the initial values or the fill values of the filled database to generate a perturbed database such that distance metrics between rows of the perturbed database and rows of the public database are not close to each other based on $L_2$ distance; and
releasing at least a portion of the perturbed database.

8. The method of claim 7, wherein the merging of the public database and the private database to create the merged database includes averaging values of associated entries in the public database and the private database.

9. The method of claim 7, wherein the machine learning includes item-based collaborative filtering.

10. The method of claim 7, further comprising replacing the plurality of user identifiers with a plurality of random supercookies.

11. The method of claim 7, wherein the distance metrics include an $L_p$ distance that ignores entries associated with null entries of the public database.

12. The method of claim 7, wherein the distance metrics include an $L_p$ distance that considers entries associated with null entries of the public database.

13. A non-transitory computer readable medium configured to cause a system to perform operations of preserving privacy of individuals associated with database entries, the operations comprising:
merging a public database and a private database to create a merged database, the merged database including a plurality of first entries that each include a null value and the merged database including a plurality of second entries that each include an initial value, wherein each blank entry and each initial entry is associated with one of a plurality of user identifiers, and wherein each corresponding blank entry is associated with an associated user and includes the null value in response to both the public database and the private database not including information specific to the corresponding blank entry that is associated with the associated user;
generating fill values for the first entries via a machine learning algorithm and based on the initial values to create a filled database including the initial values and the fill values, wherein the fill values replace the null values and each fill value of each corresponding blank entry is an estimation of the information associated with the corresponding blank entry for the associated user of the corresponding blank entry;
perturbing one or more of the initial values or the fill values of the filled database such that one or more of the granularity, precision, and accuracy of the one or more perturbed values is decreased to create a perturbed database, wherein the perturbing the one or more of the initial values or the fill values of the filled database includes perturbing the values of the filled database such that distance metrics between rows of the perturbed database and rows of the public database are not close to each other based on $L_2$ distance; and
releasing at least a portion of the perturbed database.

14. The non-transitory computer readable medium of claim 13, wherein the merging of the public database and the private database to create the merged database includes averaging values of associated entries in the public database and the private database.

15. The non-transitory computer readable medium of claim 13, wherein the machine learning includes item-based collaborative filtering.

16. The non-transitory computer readable medium of claim 13, the operations further comprising replacing the plurality of user identifiers with a plurality of random supercookies.

17. The non-transitory computer readable medium of claim 13, wherein the distance metrics include at least one of: an $L_p$ distance that ignores entries associated with null entries of the public database, and an $L_p$ distance that considers entries associated with null entries of the public database.

* * * * *